US008683206B2

United States Patent
Sarkar et al.

(10) Patent No.: US 8,683,206 B2
(45) Date of Patent: Mar. 25, 2014

(54) SYSTEM AND METHOD OF AUTHENTICATING MULTIPLE FILES USING A DETACHED DIGITAL SIGNATURE

(75) Inventors: Susanta P. Sarkar, Rochester Hills, MI (US); Ansaf I. Alrabady, Livonia, MI (US); Thomas M. P. Catsburg, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 9 days.

(21) Appl. No.: 13/235,763

(22) Filed: Sep. 19, 2011

(65) Prior Publication Data

US 2013/0073864 A1    Mar. 21, 2013

(51) Int. Cl.
*H04L 9/28* (2006.01)
*G06F 7/04* (2006.01)

(52) U.S. Cl.
USPC ........... 713/176; 713/179; 713/181; 701/32.6

(58) Field of Classification Search
None
See application file for complete search history.

(56) References Cited

U.S. PATENT DOCUMENTS

| | | | |
|---|---|---|---|
| 7,082,615 B1 * | 7/2006 | Ellison et al. | 726/26 |
| 7,093,132 B2 * | 8/2006 | Aho et al. | 713/176 |
| 7,346,435 B2 * | 3/2008 | Amendola et al. | 701/1 |
| 7,930,546 B2 * | 4/2011 | Rhoads et al. | 713/176 |
| 7,953,980 B2 * | 5/2011 | Schluessler et al. | 713/176 |
| 7,996,038 B1 * | 8/2011 | Fujisaki | 455/556.1 |
| 8,010,157 B1 * | 8/2011 | Fujisaki | 455/556.1 |
| 8,209,540 B2 * | 6/2012 | Brouwer et al. | 713/180 |
| 8,351,984 B1 * | 1/2013 | Fujisaki | 455/556.1 |
| 2005/0289351 A1 * | 12/2005 | England et al. | 713/180 |
| 2007/0005992 A1 * | 1/2007 | Schluessler et al. | 713/193 |
| 2007/0033409 A1 * | 2/2007 | Brunk et al. | 713/176 |
| 2007/0101147 A1 * | 5/2007 | Brunk et al. | 713/176 |
| 2009/0132824 A1 * | 5/2009 | Terada et al. | 713/175 |
| 2010/0318968 A1 * | 12/2010 | Traut et al. | 717/122 |
| 2013/0124867 A1 * | 5/2013 | Clayton et al. | 713/171 |

* cited by examiner

*Primary Examiner* — Christopher Revak
(74) *Attorney, Agent, or Firm* — Cantor Colburn LLP

(57) ABSTRACT

A system and method of authenticating data files is provided. The method includes providing a plurality of software part files and a manifest file associated with the software part files. The manifest file identifies each of the plurality of software part files. The method includes associating the manifest file with a manifest detached digital signature. The method also includes digitally signing the manifest file with the manifest detached digital signature. The manifest detached digital signature authenticates the manifest file. The method includes associating each of the plurality of software part files with one a plurality of unique detached digital signatures. The method includes digitally signing each of the plurality of software part files with one of the plurality of unique detached digital signatures. Each of the plurality of unique detached digital signatures authenticates one of the software part files.

18 Claims, 2 Drawing Sheets

SYSTEM AND METHOD OF AUTHENTICATING MULTIPLE FILES USING A DETACHED DIGITAL SIGNATURE

FIELD OF THE INVENTION

Exemplary embodiments of the invention relate to a method of authenticating data files and, more particularly, to a method of authenticating data files where a plurality of software part files are each digitally signed with a unique detached digital signature.

BACKGROUND

Drivers have many opportunities to personalize their vehicles according to their preferences. For example, a user may download files off of the Internet or from a computer, and then save the files on a vehicle control module. Specifically, a user may download files such as, for example, music files or navigational files, and then save the files on the infotainment control module of his or her vehicle. However, sometimes these files may not always be downloaded from trustworthy sources, and may have issues with integrity and authenticity.

Another challenge that may occur in the area of vehicle electronics is the issue of multiple files that are each programmed by different suppliers or sources, and integrated into a single vehicle control module or multiple vehicle control modules. Specifically, the vehicle control modules may contain various files that are each created by a different source, where the files may be linked together as tightly coupled files that are part of a software package. For example, the tightly coupled files that are part of a software package may include a first file that contains an algorithm for the airbag control module, and a second file that includes calibration information that defines when an airbag associated with the airbag control module will deploy. In another example, a single monolithic image that corresponds to a vehicle control module may be too large, and therefore needs to be segmented into discrete separate files. However, each file included with the software package needs to be evaluated for authentication and integrity. It should also be noted that updates, new features, or other types of changes may be made to some of the files at a later time as well.

Several approaches currently exist for evaluating each of the files that are part of the software package. For example, a digital signature that is associated with a set of tightly coupled files may be used to authenticate the files. However, the files need to be re-signed again with another digital signature if the files are included in another application such as, for example, a different vehicle line, or for applications in different regions of the world. Accordingly, it is desirable to provide a system for authenticating multiple files using an approach that is re-useable and that may be integrated with multiple vehicle control modules.

SUMMARY OF THE INVENTION

In one exemplary embodiment of the invention a system and method of authenticating data files is provided. The method includes providing a plurality of software part files and a manifest file associated with the software part files. The manifest file identifies each of the plurality of software part files. The method includes associating the manifest file with a manifest detached digital signature. The method also includes digitally signing the manifest file with the manifest detached digital signature. In addition, the manifest file contains a hash value of each software part file. The manifest detached digital signature authenticates the manifest file. The method includes associating each of the plurality of software part files with one a plurality of unique detached digital signatures. The method includes digitally signing each of the plurality of software part files with one of the plurality of unique detached digital signatures. Each of the plurality of unique detached digital signatures authenticates one of the plurality of software part files.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
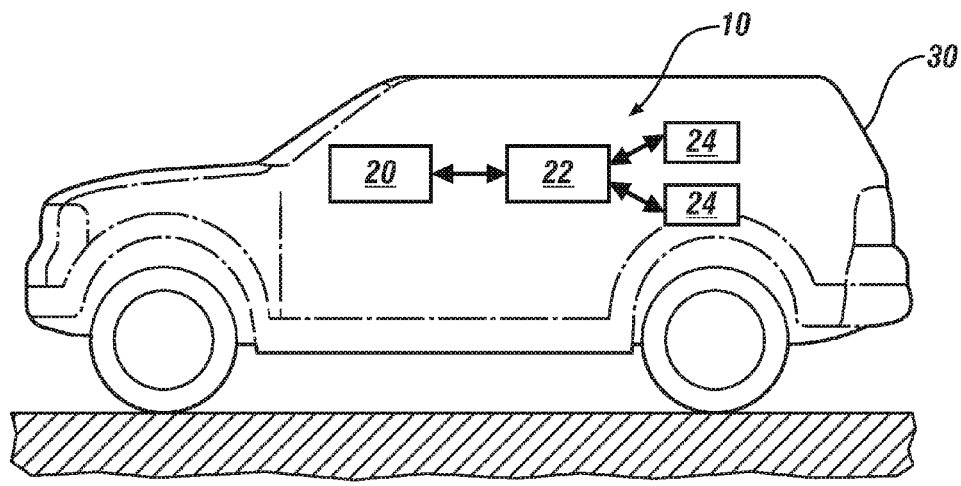
FIG. 1 is a schematic illustration of an exemplary system for authenticating data files including a storage device and at least one vehicle control module.

The following description is merely exemplary in nature and is not intended to limit the present disclosure, its application or uses. It should be understood that throughout the drawings, corresponding reference numerals indicate like or corresponding parts and features. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment of the invention, FIG. 1 is an illustration of a data file authentication system 10. The data file authentication system 10 includes a storage device 20, a communication interface 22, and at least one control module 24. In the exemplary embodiment as shown, the data file authentication system 10 is employed in a vehicle 30, where the control modules 24 are vehicle control modules. For example, the control modules 24 could be an infotainment module, a radio control module, a human machine interface ("HMI") module, an airbag control module or a navigational control module. However, it is understood that the data file authentication system 10 may be used in other applications as well.

The storage device 20 is typically any type of computing device having a memory for storing data files thereon, and may have on-vehicle file storage capability. For example, in one embodiment the storage device 20 is a universal serial bus ("USB") flash drive. In another embodiment, the storage device 20 is part of a service center diagnostic tool that is located at a dealership, where the service center diagnostic tool includes a memory for storing various files. In yet another embodiment, the storage device 20 is part of a flash programming tool that is located at a manufacturing facility. The storage device 20 is in communication with one or more of the control modules 24 through the communication interface 22. In one embodiment, the communication interface 22 is a USB interface, however it is understood that other data interface approaches may be used as well. For example, in an alternative embodiment, an 8-pin connector or a wireless connection may be used as well.

Figure 2:
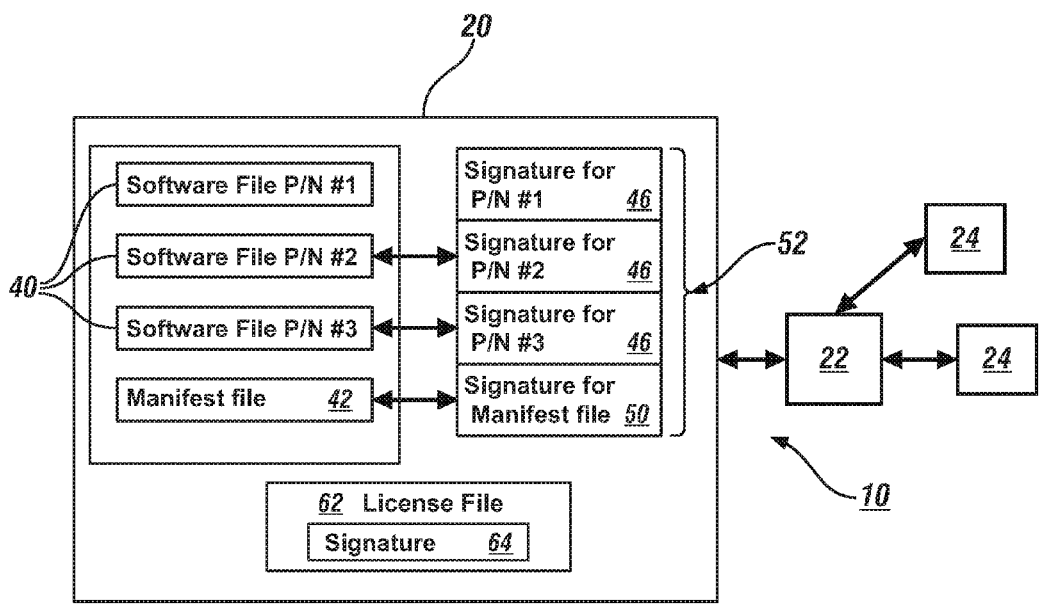
FIG. 2 is a block diagram of the system illustrated in FIG. 1 with a plurality of data files stored therein.

Turning now to FIG. 2, a block diagram of storage device 20, the communication interface 22, and the control module 24 are illustrated. The storage device 20 includes a plurality of software part files 40 and a manifest file 42. In the embodiment as illustrated, three software part files 40 are shown. The software part files 40 may be, for example, software files, calibration files, reference data files, image files, or language files. Each of the software part files 40 may include a unique identifier such as, for example, a part number that is assigned by a manufacturer. That is, each software part file 40 has a corresponding identifier such as, for example, a corresponding part number. The manifest file 42 identifies each of the software part files 40 by the software part file's unique identifier. Specifically, in one example, the manifest file 42 identifies each of the software part files 40 by a respective part number. The software part files 40 are a set of related files. That is, the software part files 40 are likely dependent on one another. In one embodiment for example, the software files are a group of tightly coupled files. For example, the software part files 40 may be part of a software package that includes a first file that contains an algorithm for the airbag control module, and a second file that includes calibration information that defines when an airbag associated with the airbag control module will deploy. Alternatively, in another embodiment the software part files 40 may include a first file that updates a user interface of a HMI module, and a second file that includes algorithms to process specific user requests for a radio control module.

Each software part file 40 has a corresponding unique detached digital signature 46. Specifically, the detached digital signatures 46 are separately stored digital signatures that are used to authenticate the software part files 40. The detached digital signatures 46 indicate if the software part files 40 originate from a trusted source. The detached digital signatures 46 may also indicate if the software part files 40 have been subjected to tampering. The manifest file 42 also includes a corresponding manifest detached digital signature 50. Similar to the detached digital signatures 46, the manifest detached digital signature 50 indicates if the manifest file 42 originates from a trusted source, and if the manifest file 42 has been subjected to tampering. In the exemplary embodiment as shown in FIG. 2, the unique detached digital signatures 46 and the manifest detached digital signature 50 are part of a single detached digital signature file 52. Each of the software part files 40 are digitally signed by one of the detached digital signatures 46, and the manifest file 42 is signed by the manifest detached digital signature 50.

In one embodiment, the storage device 20 may further include a license file 62 as well. The license file 62 is employed to generally prevent the unauthorized use of the software files 40. The license file 62 includes a digital signature 64, where the digital signature 64 authenticates or validates the license file 62. In one embodiment, if the data file authentication system 10 is in a vehicle 30, then the license file 62 may include the vehicle identification number ("VIN"), and the digital signature 64 may be based on the VIN as well as the manifest file 42.

In one embodiment, the software part files 40 and the manifest file 42 are digitally signed by employing a message digest which is also referred to as a hash value. The hash value represents a string of data having a variable length that has been transformed into a string of data having a fixed length. The hash value may be assigned to an electronic data file or a string of data of varying length, and is used to verify that the electronic data has not been altered by an unauthorized user. The hash value may be computed by a hash function. A hash algorithm or similar function may be any type of approach for computing a variable string into a fixed string. Some examples of a hash function include, but are not limited to, MD5, SHA1, SHA-256, SHA-384, and SHA-512. The detached digital signatures 46 and the manifest detached digital signature 50 each contain an encrypted hash value.

Continuing to refer to FIG. 2, the control module or modules 24 include control logic for monitoring the storage device 20 for a data signal containing the encrypted hash values of detached digital signatures 46 and the manifest detached digital signature 50. The control module 24 also includes control logic for extracting the encrypted hash values from the detached digital signatures 46 and the manifest detached digital signature 50. The control module 24 includes control logic for monitoring the storage device 20 for data containing the software part files 40 and the manifest file 42. The control module 24 further includes control logic for computing a hash value representing the data contained in each of the software part files 40 and the manifest file 42. Specifically, the control module 24 employs the hash function for generating a hash value corresponding to each of the software part files 40 and another hash value representing the data contained in the manifest file 42.

The control module 24 further includes control logic for comparing the hash value of the manifest file 42 with the hash value of the manifest detached digital signature 50. In the event that the hash values of the manifest file 42 and the manifest detached digital signature 50 both match, the integrity of the manifest file 42 is established. In the event the integrity of the manifest file 42 is established, the control module 24 includes control logic for computing hash values for the data contained in each of the software part files 40 and comparing the generated hash values with a respective hash value present in the manifest files 42. The control module 24 also includes control logic for comparing the computed hash values of the software part files 40 with hash values extracted from the respective digital detached signatures 46. In the event that the hash values of the software part files 40 and hash values extracted from the respective detached digital signatures 46 both match, this indicates that the authenticity of the software part files 40 are valid. Moreover, matching hash values also verifies the integrity of the software data files 40. Thus, the software part files 40 and the manifest file 42 may be saved onto a memory of one or more of the control modules 24. In the event that the integrity of the manifest file 42, any of the software part files 40, or the entire software package are not verified, then the software part files 40 and the manifest file 42 are not saved on the memory of the control modules 24.

In one embodiment, if a license file such as the license file 62 is required for downloading the software part files 40, then the manifest file 42 stores a license flag. The license flag is sent to one or more of the control modules 24. The license flag is an indication that a license is needed to download the software part files 40. The control modules 24 include control logic for requesting the license file from the storage device 20. In the event that the license file 62 is omitted, missing, invalid due to the VIN in the license file 62 being different from the VIN of the vehicle 30, or invalid due to the signature 64 being invalid, then the software part files 40 and the manifest file 42 will not be saved on the memory of the control module 24. Thus, the license file 62 is employed to ensure that the software part files 40 have not been stolen or otherwise obtained from an unauthorized source.

Figure 3:
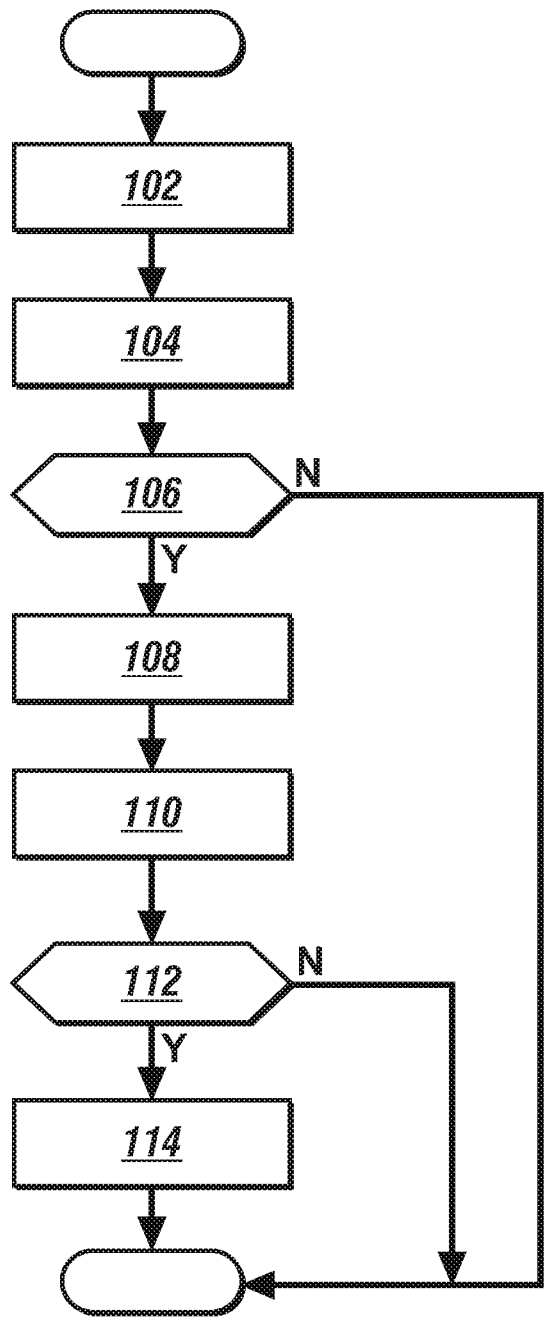
FIG. 3 is a process flow diagram illustrating a method of operating the system shown in FIG. 1.

One method of operating the data file authentication system 10 will now be explained. Referring to FIG. 3 and with continuing reference to FIGS. 1-2, an exemplary process flow diagram illustrating an exemplary process of operating the data file authentication system 10 is generally indicated by reference number 100. Method 100 begins at step 102, where one or more control modules 24 include control logic for monitoring the storage device 20 for a data signal containing a hash value of a manifest detached digital signature 50 and for data containing a manifest file 42, which are illustrated in FIG. 2. Method 100 may then proceed to step 104.

In step 104, the control module 24 includes control logic for computing a hash value for the data contained in the manifest file 42. Specifically, in one embodiment, the control modules 24 employ a hash function for generating a hash value for the data contained in the manifest file 42. The control module 24 also includes control logic for extracting the encrypted hash values from the manifest detached digital signature 50. Method 100 may then proceed to step 106.

In step 106, the control module 24 includes control logic for comparing the hash value of the manifest file 42 with the hash value of the manifest detached digital signature 50. In the event that the hash values of the manifest file 42 and the manifest detached digital signature 50 do not match, this is an indication that the manifest file 42 may have been tampered or otherwise altered. Therefore, method 100 will then terminate. In the event that the hash values of the manifest file 42 and the manifest detached digital signature match, this authenticates the manifest file 42. Once the manifest file 42 has been authenticated, method 100 may then proceed to step 108.

In step 108, the control module 24 includes control logic for monitoring the storage device 20 and extracting a list of part numbers that represent the software part files 40 from the manifest file 42. Method 100 may then proceed to step 110.

In step 110, the control module 24 includes control logic for computing a hash value for the data contained in each of the software data files 40. The control logic compares the compares the computed hash values of the software data files 40 with corresponding hash values present in the manifest file 42 to verify the integrity of the entire software package. In the event that the integrity is not established, then method 100 will terminate. The control module 24 also includes control logic for extracting the encrypted hash values from each of the detached digital signatures 46. Method 100 may then proceed to step 112.

In step 112, the control module 24 includes control logic for comparing the hash value of the software part files 40 with the hash value of the detached digital signatures 46. In the event that each of the hash values of the software data files 40 and the corresponding detached digital signatures 46 do not match, this is an indication that the software data files 40 may have been tampered or otherwise altered. Therefore, method 100 will then terminate. In the event that the hash values of the software data files 40 and the corresponding detached digital signatures 46 match, this authenticates the all of the software part files 40, and method 100 may then proceed to step 114.

In step 114, the control module 24 includes control logic for saving the software part files 40 and the manifest file 42 onto a memory of the control modules 24, as the integrity of the manifest file 42 and each of the software part files 40 have been verified. Method 100 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of authenticating data files, comprising:
   providing a plurality of software part files and a manifest file associated with the software part files, the manifest file identifying each of the plurality of software part files, wherein a vehicle control module of a vehicle manages operation of a defined vehicle function through the plurality of software part files;
   associating the manifest file with a manifest detached digital signature;
   digitally signing the manifest file with the manifest detached digital signature, wherein the manifest detached digital signature authenticates the manifest file;
   associating each of the plurality of software part files with one of a plurality of unique detached digital signatures;
   providing a detached digital signature file that contains the plurality of unique detached digital signatures and the manifest detached digital signature;
   digitally signing each of the plurality of software part files with one of the plurality of unique detached digital signatures, wherein each of the plurality of unique detached digital signatures authenticates one of the plurality of software part files; and
   providing a license file that includes a license signature, wherein the manifest file includes a license flag that is an indication that a license is needed to download the software part files.

2. The method as recited in claim 1, comprising computing a manifest file hash value of the manifest file and extracting a manifest digital signature hash value from the manifest detached digital signature.

3. The method as recited in claim 2, wherein a hash function is used to compute the manifest file hash value.

4. The method as recited in claim 2, comprising comparing the manifest file hash value and the manifest digital signature hash value to determine if the manifest file hash value and the manifest digital signature hash value match one another.

5. The method as recited in claim 4, comprising extracting a list of part numbers that represent the plurality of software part files from the manifest file if the manifest file hash value and the manifest digital signature hash value match one another.

6. The method as recited in claim 5, comprising computing a software part file hash value for each of the plurality of software part files and comparing the software part file hash value with a respective hash value that is present in the manifest file, and wherein if the software part file hash value matches the respective hash value of the manifest file then a corresponding detached digital signature hash value is extracted from each of the plurality of unique detached digital signatures.

7. The method as recited in claim 6, wherein the integrity of the plurality of software part files and the manifest file is established if each software part file hash value and the corresponding detached digital signature hash value extracted from one of the plurality of unique detached digital signatures match one another.

8. The method as recited in claim 6, wherein a hash function is used to compute the software part file hash value and the detached digital signature hash value.

9. The method as recited in claim 1, comprising providing the plurality of software part files and the manifest file as part of a group of tightly coupled files.

10. The method as recited in claim 1, wherein the at least one control module is at least one of an infotainment module, a radio control module, a human interface ("HMI") module, an airbag control module and a navigational control module.

11. The method of claim 1, further comprising:
separately storing the plurality of software part files and the manifest file from corresponding unique detached digital signatures and the manifest detached digital signature.

12. A system for authenticating data files, comprising:
a storage device having a memory for storing a plurality of software part files, a manifest file associated with the plurality of software part files, a plurality of unique detached digital signatures, and a manifest detached digital signature, the manifest file identifying each of the plurality of software part files, wherein each of the plurality of unique detached digital signature authenticates a corresponding one of the plurality of software part files, and wherein the manifest detached digital signature authenticates the manifest file, the plurality of unique detached digital signatures and the manifest detached digital signature being part of a detached digital signature file, a license file including a license signature, wherein the manifest file includes a license flag that is an indication that a license is needed to download the software part files; and
at least one control module that is connected to the storage device for sending and receiving data from the storage device, the at least one control module comprising a vehicle control module of a vehicle that manages operation of a defined vehicle function through the plurality of software part files, the control module comprising:
a control logic for monitoring the storage device for the plurality of software part files, the manifest file, the plurality of software part files, the plurality of unique detached digital signatures, and the manifest detached digital signature;
a control logic for computing a manifest file hash value representing data contained in the manifest file;
a control logic for extracting a manifest digital signature hash value from the manifest detached digital signature;
a control logic for comparing the manifest file hash value with the manifest digital signature hash value and authenticating the manifest file if the manifest file hash value matches the manifest digital signature hash value;
a control logic for computing a unique software part file hash value for each of the plurality of software part files and comparing the software part file hash value with a respective hash value that is present in the manifest file;
a control logic for extracting a detached digital signature hash value from each of the plurality of unique detached digital signatures if the software part file hash value matches the respective hash value of the manifest file;
a control logic for comparing the unique software part file hash value for each of the plurality of software part files with the detached digital signature hash value from the corresponding one of the plurality of unique detached digital signatures; and
a control logic for authenticating the plurality of software part files and the manifest file if the unique software part file hash value for each of the plurality of software part files matches the detached digital signature hash value from the corresponding one of the plurality of unique detached digital signatures.

13. The system as recited in claim 12, comprising a communication interface, the storage device in communication with the at least one control module through the communication interface.

14. The system as recited in claim 13, wherein the communication interface is one of a universal serial bus ("USB") interface, a wireless connection, and an 8-pin connector.

15. The system as recited in claim 12, wherein the at least one control module is at least one of an infotainment module, a radio control module, a human interface ("HMI") module, an airbag control module and a navigational control module.

16. The system as recited claim 12, wherein a hash function is used to compute the manifest file hash value and the manifest digital signature hash value.

17. The system as recited in claim 12, wherein a hash function is used to compute the software part file hash value and the detached digital signature hash value.

18. The system as recited in claim 12, wherein the license signature is based on a vehicle identification number ("VIN") and the manifest file.

* * * * *